US007480276B2

(12) United States Patent
Moloney

(10) Patent No.: US 7,480,276 B2
(45) Date of Patent: Jan. 20, 2009

(54) METHOD AND ARRANGEMENT FOR DATA PROCESSING IN A COMMUNICATION SYSTEM

(75) Inventor: Joseph Keith Charles Moloney, Oldbury on Severn (GB)

(73) Assignee: IPWireless, Inc., San Bruno, CA (US)

( * ) Notice: Subject to any disclaimer, the term of this patent is extended or adjusted under 35 U.S.C. 154(b) by 629 days.

(21) Appl. No.: 10/310,082

(22) Filed: Dec. 4, 2002

(65) Prior Publication Data

US 2005/0018710 A1 Jan. 27, 2005

(30) Foreign Application Priority Data

Dec. 5, 2001 (GB) ................................. 0129103.8

(51) Int. Cl.
*H04B 7/216* (2006.01)
*H04L 12/54* (2006.01)
*H04J 3/16* (2006.01)

(52) U.S. Cl. .................... 370/335; 370/465; 370/389
(58) Field of Classification Search ................ 455/458; 370/328, 392, 469, 258, 235, 335, 337, 389
See application file for complete search history.

(56) References Cited

U.S. PATENT DOCUMENTS

| 5,249,292 A | * | 9/1993 | Chiappa ...................... 370/392 |
| 5,341,369 A | | 8/1994 | Langer |
| 5,363,315 A | | 11/1994 | Weiss et al. |
| 5,701,479 A | * | 12/1997 | Venable et al. ............... 718/100 |
| 5,995,517 A | * | 11/1999 | Tomida et al. ............... 370/486 |
| 6,807,192 B2 | | 10/2004 | Terry |
| 7,009,973 B2 | * | 3/2006 | Cao et al. ..................... 370/392 |
| 7,221,657 B2 | * | 5/2007 | Bergenlid et al. ........... 370/252 |
| 2001/0008838 A1 | * | 7/2001 | Toskala et al. ............... 455/458 |
| 2001/0043576 A1 | * | 11/2001 | Terry ........................... 370/328 |
| 2002/0071407 A1 | * | 6/2002 | Koo et al. .................... 370/335 |
| 2005/0185651 A1 | * | 8/2005 | Rinne ........................ 370/395.1 |

FOREIGN PATENT DOCUMENTS

| EP | 0572865 | | 12/1993 |
| GB | 2369006 | | 5/2002 |
| WO | WO-00/10297 A1 | | 2/2000 |
| WO | WO 00/10302 | * | 2/2000 |
| WO | WO-00/10302 A1 | | 2/2000 |

(Continued)

OTHER PUBLICATIONS

"Universal Mobile Telecommunications System (UMTS); Multiplexing and channel coding (FDD) (3GPP TS 25.212 version 4.3.0 Release 4)," (Dec. 2001), 3GPP, ETSI TS 125 212 V4.3.0, pp. 1-63.

(Continued)

*Primary Examiner*—Tilahun B Gesesse
(74) *Attorney, Agent, or Firm*—Morrison & Foerster LLP

(57) ABSTRACT

A method and apparatus (300) for processing data in a communication system (400), using a configuration header (310) containing configuration data for use in processing data through a plurality of processes including a first process and a second process and passing the configuration header (310) with inter-process data (320) form the first process to the second process, whereby the second process extracts configuration data from the configuration header passed from the first process.

16 Claims, 4 Drawing Sheets

FOREIGN PATENT DOCUMENTS

| WO | WO-02052777 | 7/2002 |
| WO | WO-03/049385 A2 | 6/2003 |

OTHER PUBLICATIONS

International Search Report mailed on Jul. 4, 2003, for PCT Application No. PCT/GB02/05526, filed Dec. 5, 2002, three pages.

Search Report dated Jul. 31, 2002, for GB Application No. 0129103.8 filed Dec. 5, 2001, two pages.

Examination Report dated Jul. 30, 2004, for GB Application No. 0129103.8 filed Dec. 5, 2001, three pages.

\* cited by examiner

METHOD AND ARRANGEMENT FOR DATA PROCESSING IN A COMMUNICATION SYSTEM

FIELD OF THE INVENTION

This invention relates to data processing in communication systems, and particularly though not exclusively to Coded Composite Transport Channel (CCTrCH) processing in packet-based UTRA TDD (UMTS—Universal Mobile Telecommunication System—Terrestrial Radio Access systems operating in Time Division Duplex mode).

BACKGROUND OF THE INVENTION

In a UMTS Terrestrial Radio Access Network (UTRAN) there are two modes of operation Frequency Division Duplex (FDD) and Time Division Duplex (TDD). In UTRA TDD, which is packet-based, users are separated in both the code domain and time domain. The time domain UTRA framing has 4096 radio frames which make up a super frame with each radio frame consisting of 15 timeslots. A timeslot can be allocated to either Uplink (UL) or downlink (DL) transmission.

In a typical TDD system the UL and DL transmissions have to be synchronized to reduce interference. In addition DL broadcast signaling and UL random access signaling has to be supported. This leads to a partitioning of the radio frame with individual timeslots being dedicated for use either for DL or UL. UTRA specifies the processing that is applied to Transport Channel (TrCH) data by Layer 1 (L1) to build up CCTrCHs. These CCTrCHs are mapped onto timeslots.

Each CCTrCH has a particular set of characteristics, which change dynamically for each CCTrCH that is processed. Possible configuration parameters that may be applied dynamically to each CCTrCH include: number of TrCHs in a CCTrCH; CRC length; transport block size; type of channel coding; Transmission Time Interleave (TTI) period; and amount of physical resource.

An implementation of a CCTrCH processing stack may contain a mixture of hardware and software implementations of individual processing steps. Each processing step requires configuration information.

The conventional approach has been to use a centralized controller for this processing. However this approach has the following disadvantages:

1) the controlling entity must store the configuration parameters for the CCTrCH;
2) the controlling entity must keep track of the CCTrCH as it is processed by each of the processing steps and recall the configuration parameters in order that they can be applied along with the data to the next processing step; and
3) as the amount of output data for a process is not necessarily the same as the input data the controlling entity must calculate and control the following process with this data.

This conventional approach becomes complex when the configuration data changes dynamically for each CCTrCH as it is processed and the latency through each process changes depending on the configuration itself.

A need therefore exists for processing of data in a communication system wherein the above-mentioned disadvantage(s) may be alleviated.

STATEMENT OF INVENTION

In accordance with a first aspect of the present invention there is provided a method for processing data in a communication system, the method comprising:
 providing a configuration header containing configuration data for use in processing data through a plurality of processes including a first process and a second process; and
 passing the configuration header with inter-process data from the first process to the second process,
 whereby the second process extracts configuration data from the configuration header passed from the first process.

In accordance with a second aspect of the present invention there is provided an arrangement for processing data in a communication system, the arrangement comprising:
 means for providing a configuration header containing configuration data for use in processing data through a plurality of processing means including a first process means and a second processing means; and
 means for passing the configuration header with inter-process data from the first processing means to the second processing means,
 whereby the second processing means is arranged to extract configuration data from the configuration header passed from the first processing means.

In accordance with a third aspect of the present invention there is provided a communication system including means for processing data comprising:
 means for providing a configuration header containing configuration data for use in processing data through a plurality of processing means including a first process means and a second processing means; and
 means for passing the configuration header with inter-process data from the first processing means to the second processing means,
 whereby the second processing means is arranged to extract configuration data from the configuration header passed from the first processing means.

BRIEF DESCRIPTION OF THE DRAWINGS

One method and arrangement for processing of CCTrCH data in a packet data UTRA TDD system incorporating the present invention will now be described, by way of example only, with reference to the accompanying drawings, in which.

DESCRIPTION OF PREFERRED EMBODIMENT

Figure 1:
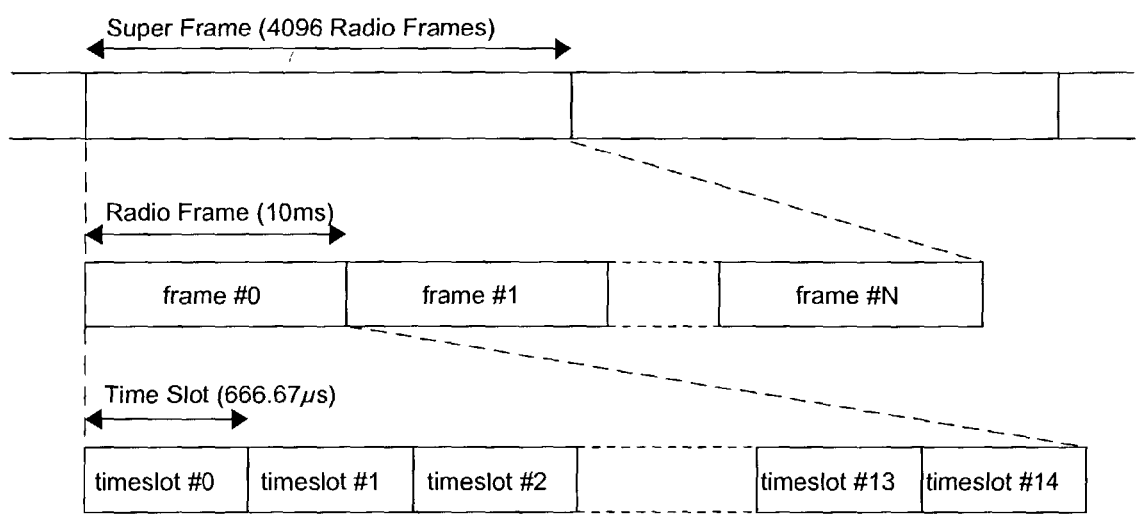
FIG. 1 shows a block schematic diagram illustrating time domain UTRA framing.

In a UMTS Terrestrial Radio Access Network (UTRAN) there are two modes of operation: UTRA Frequency Division Duplex (FDD) and UTRA Time Division Duplex (TDD). In UTRA TDD users are separated in both the code domain and time domain. In the time domain employed in UTRA framing, illustrated in FIG. 1, 4096 radio frames make up a super frame with each radio frame consisting of 15 timeslots. A timeslot can be allocated to either Uplink (UL) or Downlink (DL) transmission.

In a typical TDD system the UL and DL transmissions have to be synchronized to reduce interference. In addition DL broadcast signaling and UL random access signaling has to be supported. This leads to a possible partitioning of the radio frame as shown below:

| 0 | 1 | 2 | 3 | 4 | 5 | 6 | 7 | 8 | 9 | 10 | 11 | 12 | 13 | 14 |
|---|---|---|---|---|---|---|---|---|---|----|----|----|----|----|
| DL | DL | DL | DL | DL | DL | DL | DL | UL | UL | UL | UL | UL | UL | UL |

Figure 2:
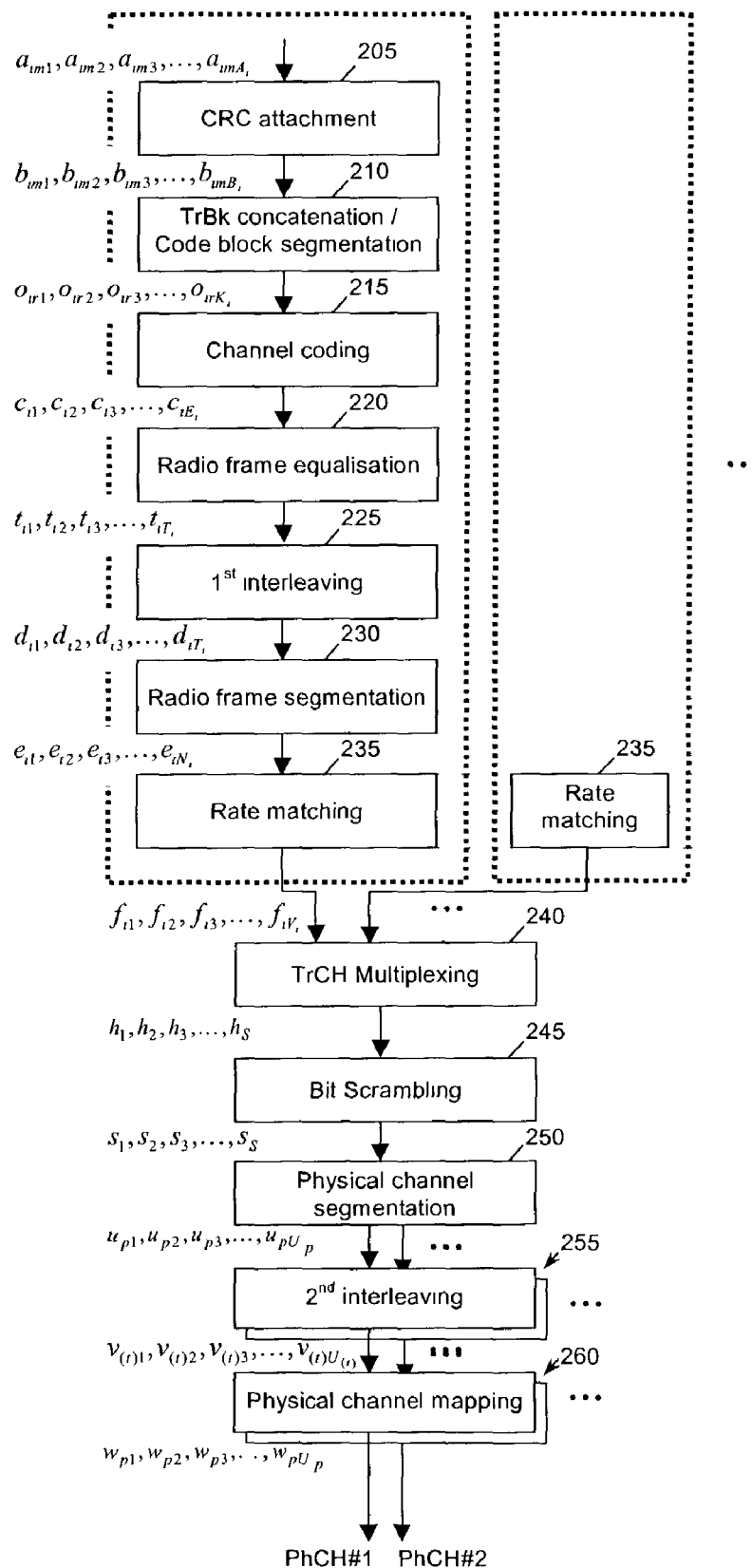
FIG. 2 shows a block schematic diagram illustrating multiplexing and channel coding in UTRA.

UTRA specifies the processing that is applied to the Transport Channel (TrCH) data by Layer 1 (L1), as shown in FIG. 2.

Transport Blocks (blocks of a defined number of bits) are submitted by the media access control (MAC) to L1 for processing. A Transport Block typically corresponds to a MAC protocol data unit (PDU) or corresponding unit. Layer 1 processes each Transport Block as shown in FIG. 2 to build up CCTrCHs. Firstly, cyclic redundancy check (CRC) attachment is performed at 205; then, transport block (TrBk) concatenation/code block segmentation is performed at 210. Next, channel coding is performed at 215; then, radio frame equalisation is performed at 220. Next, first interleaving is performed at 225; then, radio frame segmentation is performed at 230, and rate matching is performed at 235. A number of rate-matched data streams are multiplexed together on a single transport channel at 240; then, the resultant multiplexed data stream is processed by bit scrambling at 245. The bit-scrambled data stream is segmented into a number of physical channels at 250; then, second interleaving is performed on each of the segmented physical channel data streams at 255. Finally, physical channel mapping is performed at 260 to produce a number of CCTrCHs for physical channels such as PhCH#1 and PhCH#2. These CCTrCHs are mapped onto timeslots in known manner.

Each CCTrCH has a particular set of characteristics. These characteristics change dynamically for each CCTrCH that is processed. The following lists examples of some of the possible configuration parameters that may be applied dynamically to each CCTrCH:

1) Number of TrCHs in a CCTrCH
2) CRC length
3) Transport Block Size
4) Type of Channel coding
5) Transmission Time Interleave (TTI) period
6) Amount of physical resource In practice, an implementation of a CCTrCH processing stack may contain a mixture of hardware and software implementations of the individual processing steps shown in FIG. 2. Each processing step requires configuration information.

The conventional approach is to use a centralized controller. However, this approach has a number of disadvantages:

The controlling entity must store the configuration parameters for the CCTrCH.

The controlling entity must keep track of the CCTrCH as it is processed by each of the processing steps and recall the configuration parameters in order that they can be applied along with the data to the next processing step.

As the amount of output data for a process is not necessarily the same as the input data the controlling entity must calculate and control the following process with this data.

This approach becomes complex when the configuration data changes dynamically for each CCTrCH as it is processed, and the latency through each process changes depending on the configuration itself.

The present invention, at least in the preferred embodiment described below, utilises a method for simplifying the problem of control of configuration parameters in a CCTrCH processing stack, though it can equally be applied to any processing stack that has dynamic configuration parameters.

Figure 3:
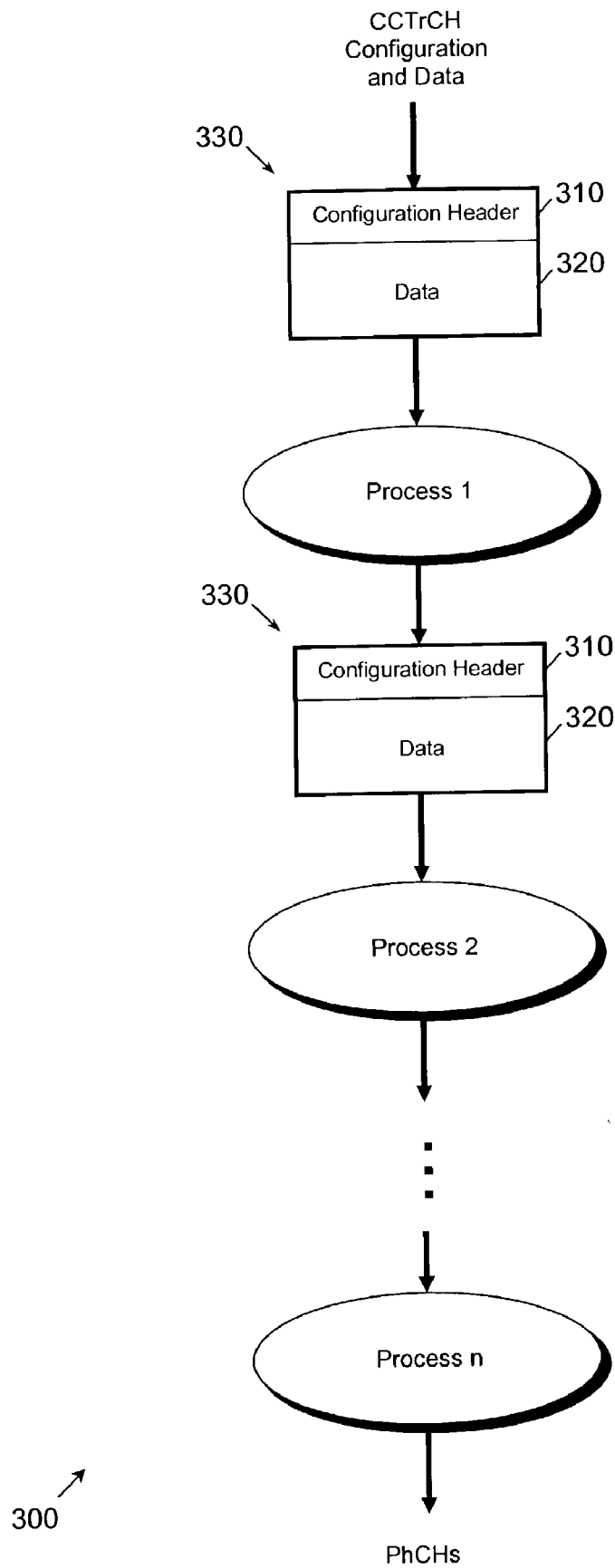
FIG. 3 shows a block schematic diagram illustrating an stack or arrangement for processing of CCTrCH data in a packet data UTRA TDD system incorporating the present invention.

Referring now to FIG. 3, to solve the problems of a centralized controller a CCTrCH configuration header 310 is attached to each of the CCTrCH data blocks when applying the data to the CCTrCH processing stack for processing CCTrCH information for communication across the UTRA TDD system's air interface. The CCTrCH configuration header 310 is internally derived (e.g., within a receiver by L1 Signalling) and, in a preferred embodiment, includes a TFI (Transport Format Indicator) passed over the air-interface.

At each stage or processing element of the processing stack or arrangement 300 the header 310 is read along with the input data 320 by the process in order to gain the configuration data the process requires.

The same header 310 is then attached to its output data 320 (to form an integral CCTrCH data block 330) for use by the next process in the CCTrCH processing stack. The processing stage may also add extra configuration data (e.g., output data size) to the configuration header, that can save recalculation of certain parameters.

Thus, it will be understood, in employing the configuration headers 310, in the above method:

1) a CCTrCH configuration header 310 is attached to every CCTrCH data block that is applied to a CCTrCH processing stack;
2) the CCTrCH configuration header 310 is treated as an integral part of the CCTrCH data 330;
3) each processing stage in the CCTrCH processing stack interrogates the CCTrCH configuration header 310 in order to gain the configuration data it requires;
4) each processing stage in the CCTrCH processing stack attaches the header 310 to its output data 320; and
5) each processing stage may add extra configuration data to the CCTrCH header 310.

It will be understood and appreciated that the method and arrangement utilising configuration headers described above provides the advantages that the controlling entity does not need to store the configuration parameters for the CCTrCH, since they are passed in the configuration header; nor does the controlling entity need to keep track of the CCTrCH as it is processed by each of the processing steps; nor does the controlling entity need to calculate and control a following process with data output from a previous process, since the processing proceeds methodically from one process to another using the configuration headers.

It will also be understood and appreciated that the method and arrangement described above allows CCTrCH processing to be performed, without the need for central control, by proceeding methodically from one processing step to another without prior knowledge of the processing latencies of each processing step.

It will be appreciated that the method described above for processing of CCTrCH data may be carried out in software running on a processor (not shown), and that the software may be provided as a computer program element carried on any suitable data carrier (also not shown) such as a magnetic or optical computer disc.

It will be also be appreciated that the method described above for processing of CCTrCH data may alternatively be carried out (in part or in whole) in hardware, for example in the form of an integrated circuit (not shown) such as an FPGA (Field Programmable Gate Array) or ASIC (Application Specific Integrated Integrated Circuit).

Figure 4:
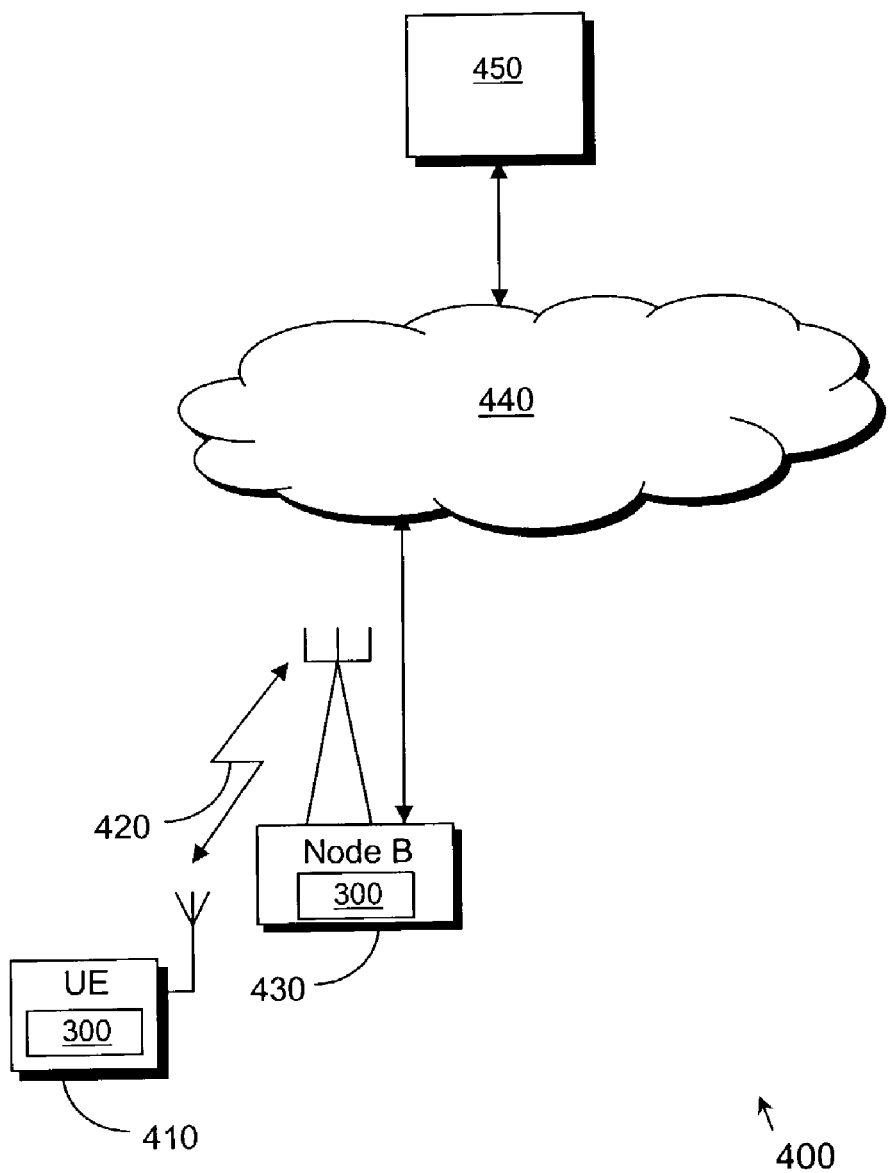
FIG. 4 shows a block-schematic diagram of a UTRA TDD system in which the invention is used.

It will further be appreciated that although the method described above for processing of CCTrCH data has been presented in the context of processing CCTrCH data for transmission, the same technique of using configuration headers passed between successive processing stages may equally be performed in processing received CCTrCH data. Referring now also to FIG. 4, a UTRA TDD system 400 includes a user terminal 410 (commonly referred to as 'User Equipment') which communicates over a CDMA radio link 420 with a base station 430 (commonly referred to as a 'Node B'). The Node B 430 is controlled by a radio network controller 440, which communicates with other system infrastructure shown collectively as 450. Such a system (insofar as it has been described up to this point) is well known and need not be described further. However, it will be understood that the processing stack or arrangement 300 described above for processing CCTrCH data may be advantageously implemented in either a UE 410 or a Node B 430 of the system as shown in the figure.

It will further be appreciated that although the invention has been described above in the context of processing CCTrCH data in a UTRA TDD system, the invention may be generally applied to data processing in any communication system.

In conclusion, therefore, it will be understood that the use of configuration headers in a data processing in a communication system as described avoids the disadvantages of using a central controller and allows processing to proceed from one processing step to another without requiring prior knowledge of the processing latencies of each processing step.

The invention claimed is:

1. A method for processing data in a Universal Mobile Telecommunications System Terrestrial Radio Access (UTRA) communication system operating in Time Division Duplex (TDD) mode, the method comprising:
   generating a first signal including a configuration header containing configuration data for processing in a plurality of processes including a first process and a second process;
   processing the configuration header of the first signal by the first process in order to generate inter-process data;
   generating a second signal including the inter-process data and the configuration header; and
   passing the second signal including the configuration header and inter-process data from the first process to the second process.

2. The method of claim 1, wherein the plurality of processes includes a third process, and the method further comprises the second process passing a third signal to the third process, the third signal including the configuration header.

3. The method of claim 1 wherein the communication system is a packet data wireless communication system.

4. The method of claim 1 wherein the method is for processing Coded Composite Transport Channel (CCTrCH) data.

5. A computer-readable medium comprising computer instructions for performing the method of claim 1.

6. A communication unit for processing data Universal Mobile Telecommunications System Terrestrial Radio Access (UTRA) communication system operating in Time Division Duplex (TDD) mode, the communication unit comprising:
   means for generating a first signal including a configuration header containing configuration data for processing in a plurality of processing means including a first processing means and a second processing means;
   means for processing the configuration header of the first signal by the first processing means in order to generate inter-process data;
   means for generating a second signal including the inter-process data and the configuration header; and
   means for passing the second signal including configuration header and inter-process data from the first processing means to the second processing means.

7. The communication unit of claim 6, wherein the plurality of processing means includes a third processing means, and wherein the second processing means is operable for passing a third signal to the third process, the third signal including the configuration header.

8. The communication unit of claim 6 wherein the communication system is a packet data wireless communication system.

9. The communication unit of claim 6 wherein the communication unit is operable for processing Coded Composite Transport Channel (CCTrCH) data.

10. User equipment for use in a communication system, the user equipment comprising the communication unit of claim 6.

11. A base station for use in a communication system, the base station comprising the communication unit of claim 6.

12. An integrated circuit comprising the communication unit of claim 6.

13. A communication system including means for processing data Universal Mobile Telecommunications System Terrestrial Radio Access (UTRA) communication system operating in Time Division Duplex (TDD) mode, the system comprising:
   means for generating a first signal including a configuration header containing configuration data for processing in a plurality of processing means including a first processing means and a second processing means;
   means for processing the configuration header of the first signal by the first processing means in order to generate inter-process data;
   means for generating a second signal including the inter-process data and the configuration header; and
   means for passing the second signal including configuration header and inter-process data from the first processing means to the second processing means.

14. The system of claim 13, wherein the plurality of processing means includes a third processing means, and wherein the second processing means is operable for passing a third signal to the third process, the third signal including the configuration header.

15. The system of claim 13 wherein the communication system is a packet data wireless communication system.

16. The system of claim 13 wherein the means for processing data is operable for processing Coded Composite Transport Channel (CCTrCH) data.

* * * * *